United States Patent [19]

Sundaram

[11] Patent Number: 5,394,285
[45] Date of Patent: Feb. 28, 1995

[54] MULTI-TRACK LONGITUDINAL, METAL-IN-GAP HEAD

[75] Inventor: Richard H. Dee, Mahadavar Ramesh, Ramesh Sundaram, all of Louisville, Colo.

[73] Assignee: Storage Technology Corporation, Louisville, Colo.

[21] Appl. No.: 94,322

[22] Filed: Jul. 21, 1993

[51] Int. Cl.⁶ .............................. G11B 5/29
[52] U.S. Cl. ................................ 360/121
[58] Field of Search .................. 360/121, 126

[56] References Cited

U.S. PATENT DOCUMENTS

| | | | |
|---|---|---|---|
| 3,591,729 | 7/1971 | Camras | 179/100.2 |
| 4,150,981 | 4/1979 | O'Handley | 75/170 |
| 4,369,477 | 1/1983 | Hanaoka | 360/126 |
| 4,488,195 | 12/1984 | Yanagiuchi et al. | 360/125 |
| 4,578,728 | 3/1986 | Sakakima et al. | 360/125 |
| 4,636,898 | 1/1987 | Suzuki, deceased et al. | 360/122 |
| 4,651,248 | 3/1987 | Shiiki et al. | 360/119 |
| 4,752,850 | 6/1988 | Yamada et al. | 360/126 X |
| 4,755,899 | 7/1988 | Kobayashi et al. | 360/125 |
| 4,775,909 | 10/1988 | Inoue et al. | 360/126 X |
| 4,797,767 | 1/1989 | Baus, Jr. | 360/121 |
| 4,809,110 | 2/1989 | Hertrich | 360/122 |
| 4,864,717 | 9/1989 | Baus, Jr. | 29/603 |
| 4,884,157 | 11/1989 | Roberts et al. | 360/125 |
| 4,899,434 | 2/1990 | Roberts | 29/603 |
| 4,901,179 | 2/1990 | Satomi et al. | 360/126 |
| 4,967,300 | 10/1990 | Reid et al. | 360/122 |
| 5,027,245 | 6/1991 | Nagata et al. | 360/121 |
| 5,065,483 | 11/1991 | Zammit | 29/603 |
| 5,134,534 | 7/1992 | Sasaki | 360/126 |
| 5,142,768 | 9/1992 | Aboaf et al. | 29/603 |
| 5,157,569 | 10/1992 | Kumasaka et al. | 360/126 |
| 5,164,870 | 11/1992 | Kato et al. | 360/119 |
| 5,189,579 | 2/1993 | Colineau | 360/126 X |

*Primary Examiner*—A. J. Heinz
*Attorney, Agent, or Firm*—Sterne, Kessler, Goldstein & Fox

[57] ABSTRACT

A multi-track longitudinal magnetic tape head capable of writing data to high-coercivity magnetic tapes is disclosed. The multi-track, longitudinal magnetic tape head according to the present invention comprises a plurality of write elements and read elements. The write elements comprise a write pole separated from a substrate by a write gap. The write poles each comprise a block of magnetic material, having a planar gap surface and a convex top surface. A high $B_s$ composition is deposited on an etched portion of the magnetic material of each write pole at the gap surface. As a result, the gap surface comprises high $B_s$ composition extending from the top convex surface to a point part way down the gap surface. A method for manufacturing this multi-track longitudinal tape head is also disclosed.

20 Claims, 8 Drawing Sheets

MULTI-TRACK LONGITUDINAL, METAL-IN-GAP HEAD

BACKGROUND OF THE INVENTION

1. Field of the Invention

The present invention relates generally to magnetic tape heads, and more specifically to a multi-track longitudinal tape head having a unique metal-in-gap configuration to increase gap-field strength.

2. Related Art

Magnetic tape drives are commonplace in today's computer industry. These tape drives are used to store digital information onto magnetic tapes and to subsequently read the stored information. Two examples of a magnetic tape drive are the IBM 3480 tape drive available from International Business Machines in Armonk, N.Y., and the StorageTek 4480 tape drive available from Storage Technology Corporation in Louisville, Colo.

Magnetic tapes are typically available in two formats: the cassette and the cartridge. The cassette tape is a two-reel mechanism that includes a supply reel and a take-up reel. Cassette tape drives thread the magnetic tape along a transport path, past one or more magnetic transducer heads, and then transport the tape such that it travels along the transport path. The tape is taken from the supply reel and wound onto the take-up reel.

For cartridge tapes, the take-up reel is external to the tape cartridge and typically provided internal to the tape drive. When a cartridge is inserted into a tape drive, it is threaded along the transport path by the tape drive and fastened to the take-up reel.

Writing data to and reading data from the magnetic tapes is accomplished using a tape head. For data operations, tape heads are typically multi-track heads capable of reading and writing several streams of data (one per track) simultaneously.

A typical tape head assembly for a digital magnetic tape drive comprises an approximately horseshoe-shaped core made from a magnetic material such as ferrite. A coil of wire wound around the core is used to induce a magnetic field within the core. The open end of the horseshoe forms what is referred to as a gap. Often times, the tape head manufacturing process leaves a slot at the opposite end of the horseshoe. This slot is known as a "back gap" and has a comparatively low magnetic reluctance to the flux lines through the core.

For write operations, a time-varying electric current is sent through the coil. This current is referred to as "write current." This write current produces a time-varying magnetic field in the core. If the core was a complete circle (e.g., a toroid) the magnetic flux lines would travel in a circle along the core. Because the core is not a complete circle but has a gap, the flux lines bridge this gap and create a "gap field."

The magnetic tape is passed over the gap at a predetermined distance such that the magnetic surface of the tape passes through a fringing field from the gap. As the write current changes, the field at the gap changes in intensity and direction. These temporal variations in gap field result in a spatial pattern of magnetization on the magnetic tape. Thus, electronic data signals can be converted to magnetic signals and the data stored magnetically on the magnetic tape.

To improve the quality of recordings, the audio and video industries have begun using high coercivity tapes. These tapes have a high residual flux density, $B_r$, and require a high coercive force, $H_c$, to write data to the tape. An example of such a tape is a metal-particle magnetic tape on which metal magnetic powder is coated on a non-magnetic substrate, wherein the metal powder forms a thin magnetic layer.

To write information to a high coercivity tape, such as a metal-particle tape, the strength of the magnetic field at the write gap must be sufficient to overcome the high coercivity of the tape. The gap field needed is typically greater than that which can be generated using conventional ferrite heads. With conventional ferrite heads, the gap field strength is substantially proportional to the write current, but only up to a threshold level where the magnetic material on either side of the frontgap (the pole tip) saturates. After this saturation point is reached, increases in write current lead to little or no increase in the gap field strength. This phenomenon is known as "pole-tip saturation."

Conventional videotape heads have been developed for writing to high coercivity tapes. These tape heads are manufactured by forming a magnetic alloy with a high saturation magnetic flux density $B_s$, such as Sendust, on a non-magnetic or magnetic core half. The presence of the high $B_s$ material on either or both sides of the front gap allows the video tape head to write to high coercivity tapes while avoiding the problem of pole tip saturation. The layer of Sendust is typically formed using vapor deposition techniques such as sputtering. An example of such a conventional tape head is illustrated in FIG. 1. The major portion of this head is formed of glass or a like non-magnetic material 102, 104 and a magnetic film 106. Magnetic film 106 is of a thickness equal to the track width formed therebetween. Magnetic film 106 is typically a high $B_s$ alloy such as Sendust.

Conventional tape heads such as the one illustrated in FIG. 1, are commonly used with audio and video tape recorders. This and additional tape head configurations using different configurations of high $B_s$ alloys are described in U.S. Pat. No. 4,755,899 to Kobayashi, et al., which is incorporated herein by reference.

The use of high coercivity tapes has been primarily confined to the audio and video industries. Currently, high coercivity tapes are also being used by data storage systems with tape transports and tape heads similar to those used in the video industry. High $B_s$ alloys, such as Sendust, do not appear to have been used in multi-track longitudinal tape heads used for data storage.

A conventional multi-track longitudinal tape head module 200 is illustrated in FIG. 2. Referring now to FIG. 2, an alternating pattern of read and write tracks is formed by providing an alternating pattern of write closure poles 202 (referred to as write poles 202) and read closure poles 206 (referred to as read poles 206) opposite a block of substrate material 208 and separated by a gap 204. A write coil is present on substrate material 208 opposite write pole 202. A read device, such as a magneto-resistive sensor, is present on substrate material 208 opposite read pole 206. Write poles 202 and read poles 206 are embedded in a non-magnetic glass matrix insulator 210. The glass insulator 210 between write poles 202 and read poles 206 acts as a track isolator. Material 212, provided for structural purposes, can be either magnetic or non-magnetic material.

For read and write operations in two tape directions, two such modules 200 are provided adjacent to one another. An example of this conventional bi-directional, read-write tape head is illustrated in FIG. 1 of U.S. Pat. No. 5,065,483 to Zammit. U.S. Pat. No. 5,065,483 is incorporated herein by reference.

Another conventional design for a multi-track longitudinal tape head is exemplified by the IBM 3480 and StorageTek 4480 18-track non interleaved tape heads. In this design, a first module is provided which comprises write closure poles opposite a first substrate with write coils. A second module is provided which comprises a solid block of ferrite opposite a second substrate with magneto-resistive sensors. The first and second modules are configured adjacent to one another to provide a unidirectional read-after-write tapehead.

The magnetic tape travels across a front face of the tape head perpendicular to gap 204 in the directions illustrated by arrow 242. The top face, the face across which the magnetic tape travels, is typically convex. During read and write operations, the tape is usually separated from the top face of the tape head by a thin layer of air.

Apparently, in conventional multi-track, longitudinal magnetic tape heads, write poles 202, and substrate 208 are made entirely of nickel-zinc-ferrite, or manganese-zinc-ferrite. As a result, the gap field strength of these conventional heads is not sufficient to write data to high coercivity tapes.

What is needed is a longitudinal multi-track tape head capable of writing data to high coercivity magnetic tapes without the problem of pole-tip saturation.

SUMMARY OF THE INVENTION

A multi-track longitudinal magnetic tape head capable of writing to high-coercivity magnetic tapes is disclosed. The magnetic tape head provides a layer of a high $B_s$ composition at the write gap to raise the pole-tip-saturation point. As a result, a stronger gap field can be generated, thereby allowing the head to write to high-coercivity tapes.

A write element is formed by positioning a write pole close to a substrate and opposite a write coil on the substrate. The write pole and the substrate are separated by a narrow gap. This creates a magnetic circuit capable of writing data to a track on the magnetic tape in response to a write current. The surfaces of the write pole and substrate that form the boundaries of the gap are planar surfaces called gap surfaces.

Part of the gap surface of at least the write pole is etched to remove a thin layer of the magnetic material. A high $B_s$ composition is deposited in place of the thin layer of pole material that has been removed. This thin layer of high $B_s$ composition extends down from the top surface of the write pole.

A read element is also provided and comprises a read pole positioned closely to an inductive read coil or a magneto-resistive sensor located on the substrate. The read pole and the substrate are positioned such that a narrow gap is formed between them. An alternating pattern of read elements and write elements is formed by positioning the read poles and write poles together, separated from each other by a non-magnetic material. The gap surface of the alternating pattern of poles is processed such that it is planar.

The high $B_s$ composition is not formed on the read poles. If the high $B_s$ composition was formed on the read poles and inductive coils are used as read sensors, the junction between the high $B_s$ composition and the magnetic read pole could act as a second read gap and introduce unwanted noise into the read signal. Therefore, high $B_s$ composition is not provided on the read poles to avoid this potential problem.

The alternating pattern of read and write poles are created such that they appear embedded in a matrix of non-magnetic insulator such as glass. The insulator partially surrounds the poles such that the top surface is exposed. It is this top surface that interfaces with the tape.

An advantage of the present invention is that it is a multi-track tape head that is capable of generating gap field strength necessary to write data to high-coercivity tapes such as metal-particle tapes.

Another advantage of the invention is the unique configuration of high $B_s$ composition. According to a preferred embodiment, high $B_s$ composition is provided on only that portion of the gap face of the write pole that is nearest to the head-to-tape interface. High $B_s$ composition need not be deposited elsewhere on the gap surface. This lessens concerns about unwanted eddy currents.

Still another advantage of the invention is that high $B_s$ composition is not used in conjunction with the read poles. This avoids the potential dual read-gap problem.

Yet another advantage of the invention is that the gap face of the tape head closure piece, including the read poles, write poles, and the glass track isolators, are a planar surface. This ensures the integrity of the gap line is maintained when the bonded closure and substrate pieces are processed to form a contour surface.

Further features and advantages of the present invention, as well as the structure and operation, of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digits of a reference number identifies the drawing in which the reference number first appears.

DETAILED DESCRIPTION OF THE INVENTION

The present invention is a multi-track, longitudinal, magnetic tape head capable of providing a gap field strong enough to write information to high coercivity magnetic tapes. The configuration disclosed herein provides a magnetic gap field that is stronger than that provided by conventional tape heads whose write poles are made entirely of ferrite.

Figure 3:
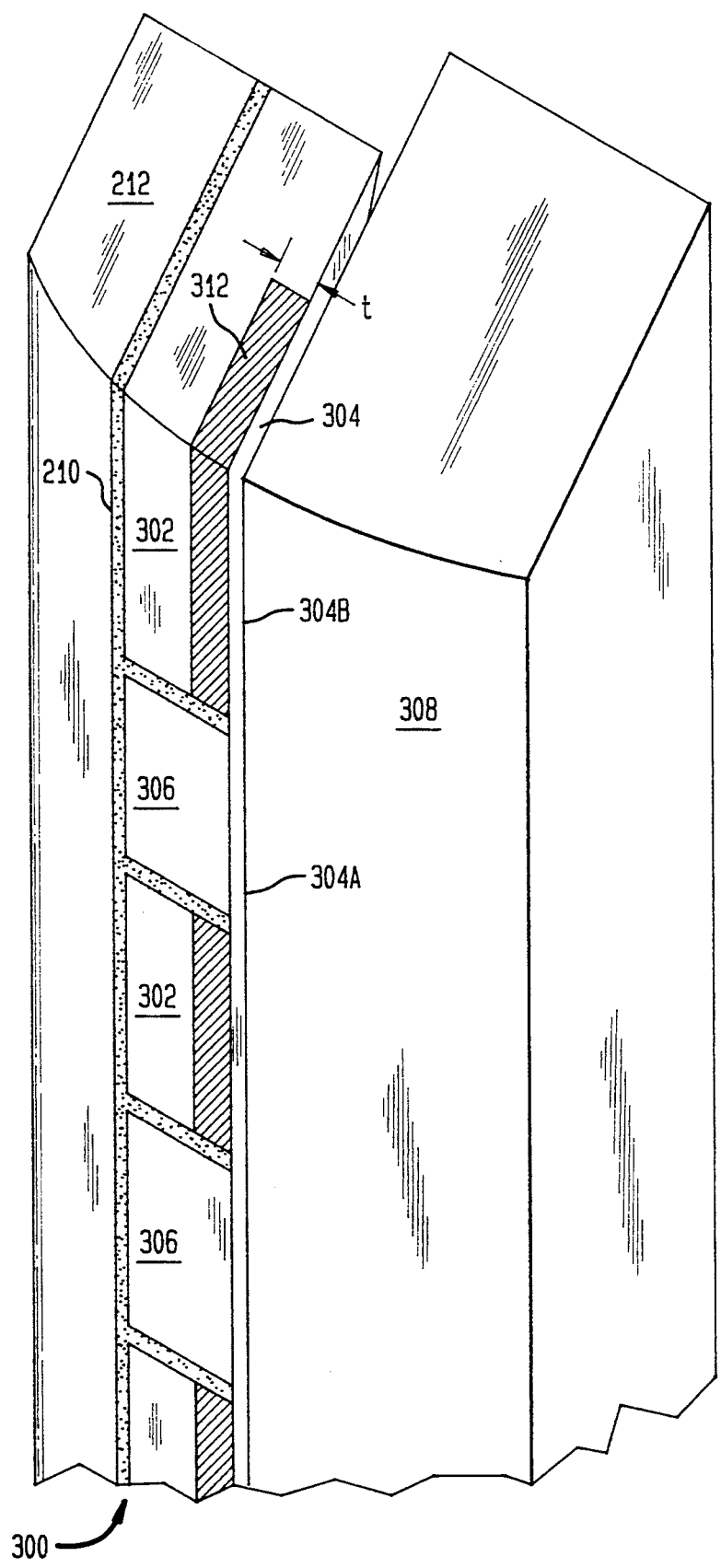
FIG. 3 is a diagram illustrating a multi-track longitudinal magnetic tape head module having a high $B_s$ composition provided at the write gap.

FIG. 3 is a perspective diagram illustrating a multi-track longitudinal metal-in-gap tape head module 300 according to the present invention. A read element is formed by providing a read closure pole 306 (referred to as read pole 306) separated from a substrate 308 by a gap 304. The portion of gap adjacent to read pole 306 will be referred to as read gap 304A. Read poles 306 and substrate 308 are usually made of magnetic materials such as nickel-zinc ferrite or manganese-zinc ferrite.

Opposite read pole 306 on substrate 308 is a magneto-resistive sensor. As the magnetic tape passes over read gap 304A, the magnetic field from the tape alters the read gap flux density. The changes in flux as the tape travels across the head are sensed by the magneto-resistive sensor.

A write element is formed by positioning a write closure pole 302 (referred to as write pole 302) separated from substrate 308 by gap 304. The portion of gap 304 between write pole 302 and substrate 308 will be referred to as write gap 304B. Write poles 302 are separated from adjacent read poles 306 by non-magnetic glass 210.

Opposite write pole 302 on substrate 308 is a write coil. As a write current is applied to the write coil, a magnetic field is induced in substrate 308 and write pole 302. The gap field in write gap 304B varies as a function of write current applied. As the magnetic tape passes over write gap 304B, the gap field changes the magnetization of magnetic particles on the tape, thus writing data to the magnetic tape.

The use of magneto-resistive sensors and write coils is well known in the art and is described in U.S. Pat. No. 5,065,483 to Zammit with reference to FIG. 4 of that patent document.

Figure 1:
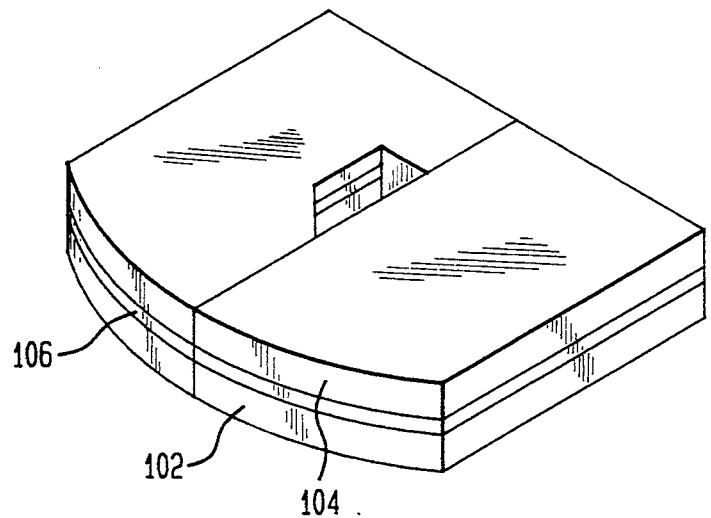
FIG. 1 is a diagram illustrating a conventional single-track video magnetic tape head.
Figure 2:
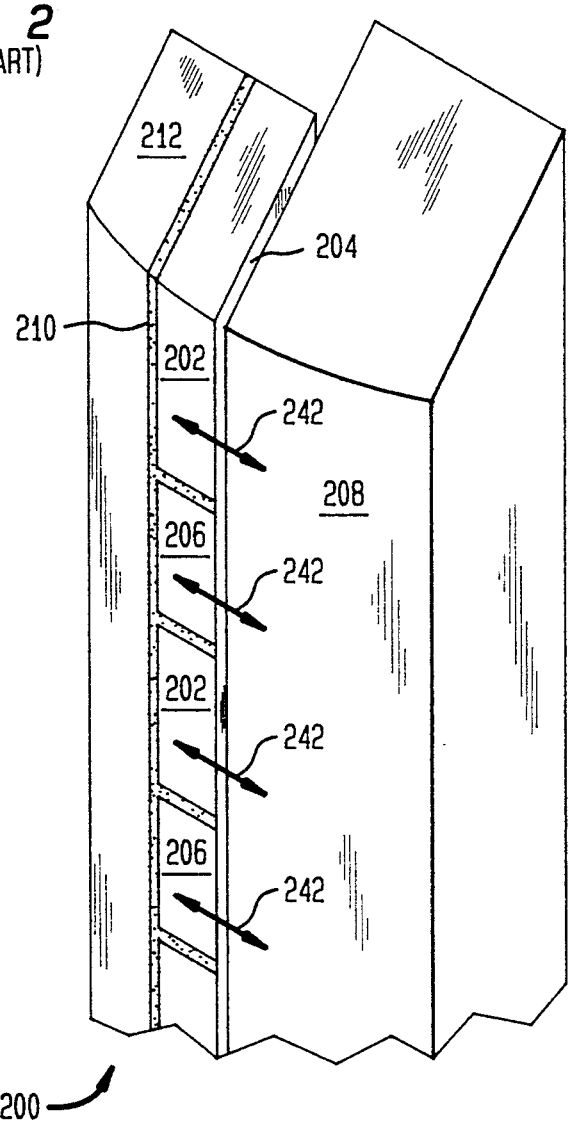
FIG. 2 is a diagram illustrating a conventional multi-track longitudinal magnetic tape head module.

With conventional longitudinal, multi-track tape heads (See FIG. 2) comprising write poles 202 made entirely of ferrite, the gap field cannot be strengthened to a point sufficient to allow writing to high coercivity tapes.

Write pole 302 according to the present invention includes a thin layer of high $B_s$ composition 312 adjacent to write gap 304B. In one embodiment high $B_s$ composition 312 is a high $B_s$ alloy. This thin layer of high $B_s$ composition 312 raises the saturation point of the write pole tip so that the gap field can be increased above the level that could otherwise be accomplished with conventional ferrite heads. As a result, the write element can provide the gap field needed to write to high coercivity magnetic tapes. An example of a suitable material for high $B_s$ composition 312 is Sendust. Sendust is an Iron-Aluminum-Silicon alloy.

In a preferred embodiment, thickness, t, of high $B_s$ composition 312 is approximately 2 microns. A suitable range of thicknesses would be 1 to 6 microns. Other thicknesses could be chosen depending on the materials used and the tape coercivity.

In another configuration, high $B_s$ composition 312 could be made as a laminate including layers of materials such as a high $B_s$ alloy and non-magnetic layers such as silicon nitride. An example of such a multi-layered structure is provided in U.S. Pat. No. 4,901,179 to Satomi et al. which is incorporated herein by reference.

Figure 8:
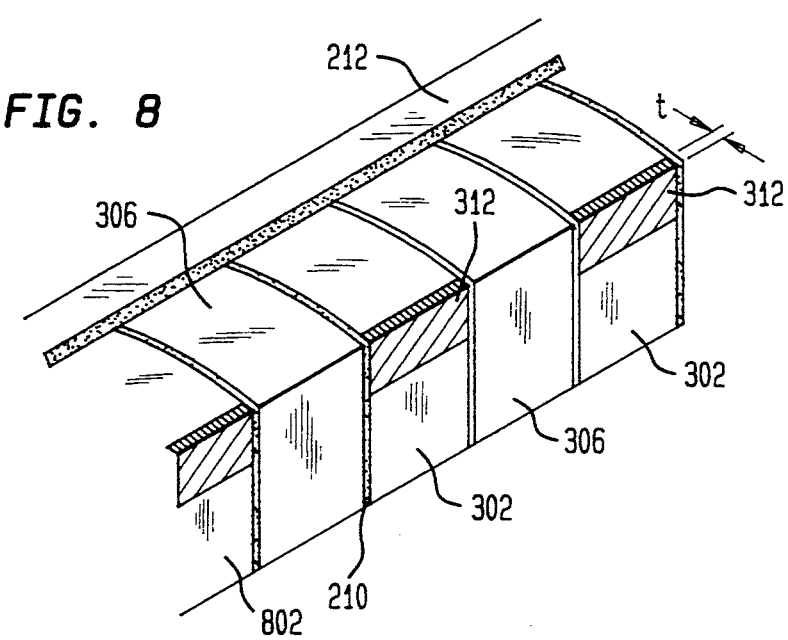
FIG. 8 is a perspective diagram illustrating the closure portion of a multi-track longitudinal magnetic tape head module having a high $B_s$ composition on the write poles.
Figure 9:
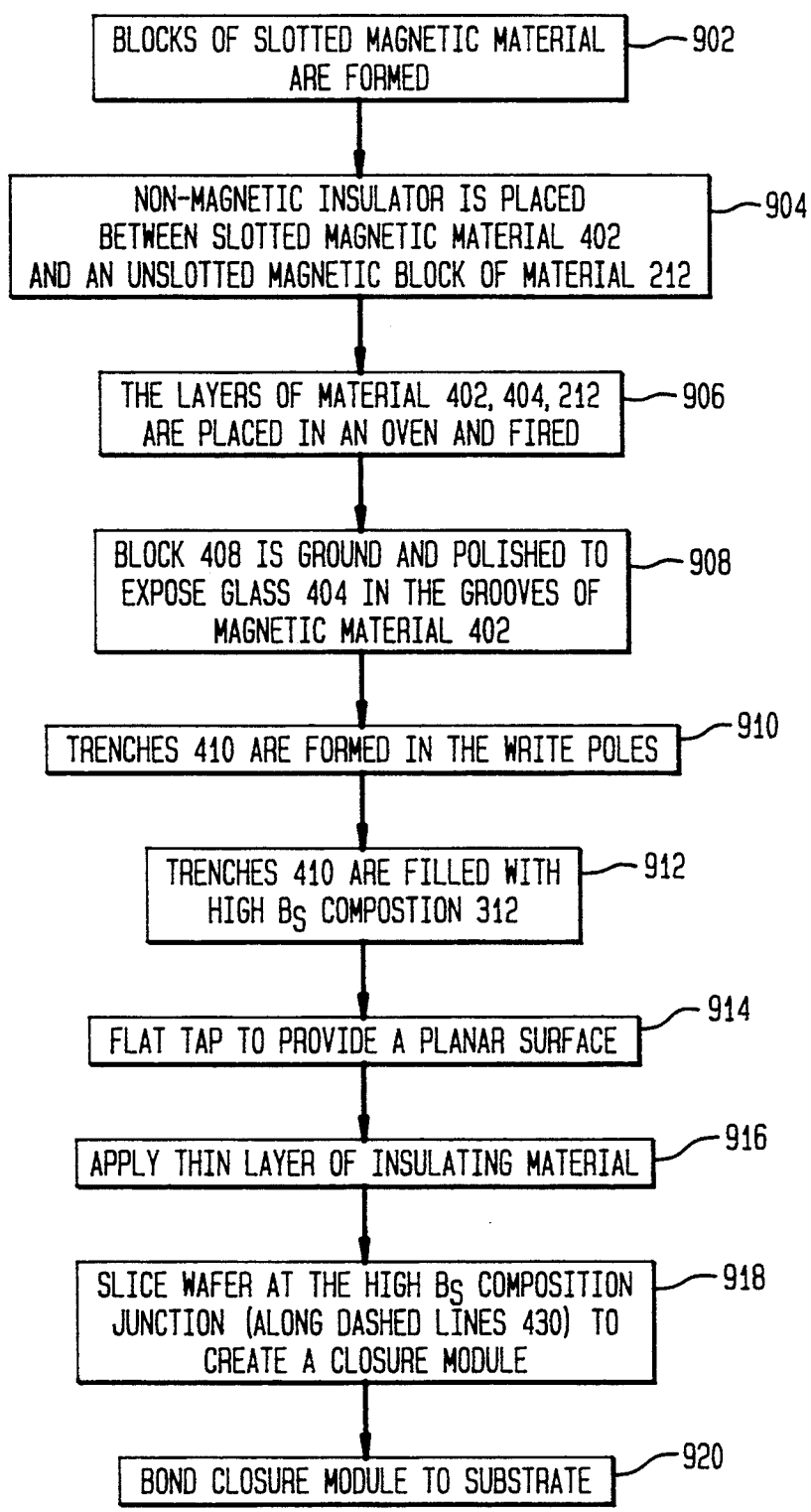
FIG. 9 is a flow chart illustrating the manufacturing steps for producing read and write poles in accordance with the invention.

In FIG. 8, the closure portion of multi-track longitudinal metal-in-gap tapehead module 300 is illustrated. Tapehead module 300 comprises write poles 302 and read poles 306. FIGS. 4A through 4D illustrate this closure portion of module 300 in various phases of fabrication. The fabrication steps are illustrated in FIG. 9. Referring to FIGS. 4A–4D, 8 and 9, in a step 902, a wafer of ferrite or other magnetic material is grooved to form a block of slotted magnetic material 402. In a step 904 a piece of glass insulating material 404 is placed between slotted magnetic material 402 and an unslotted block of material 212. Material 212 can be a magnetic or a non-magnetic material.

In a step 906, the layers of material 402, 404, 212 are is placed in an oven and fired. The firing causes glass 404 to melt and fill the grooves of slotted magnetic material 402. When cooled, the two pieces of material 402, 212 are fused together by glass 404 to form a block 408.

Figure 4A:
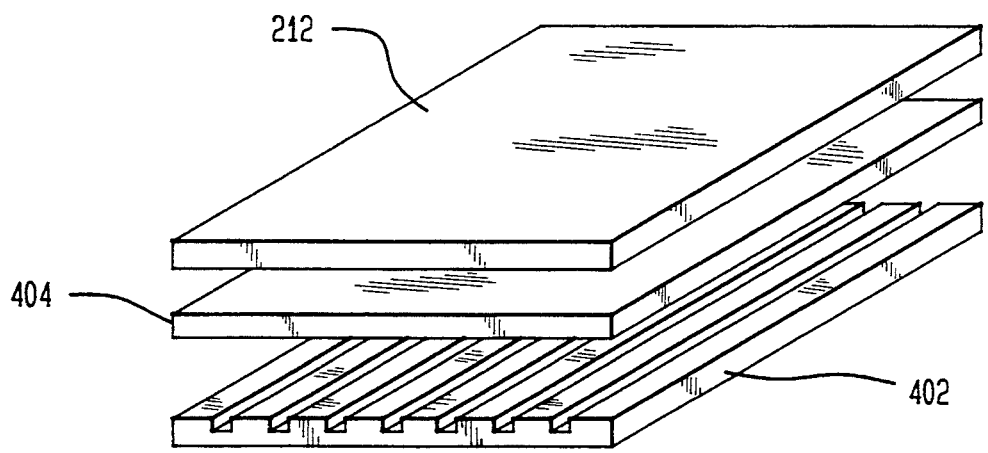
FIG. 4A–4D illustrate the various manufacturing phases of a closure portion of the multi-track, longitudinal tape head module of the present invention.
Figure 4B:
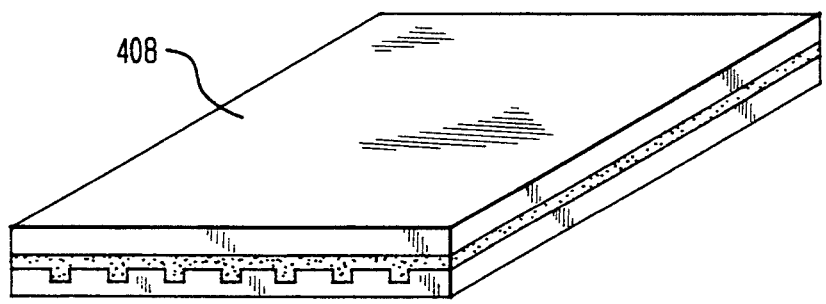
Figure 4C:
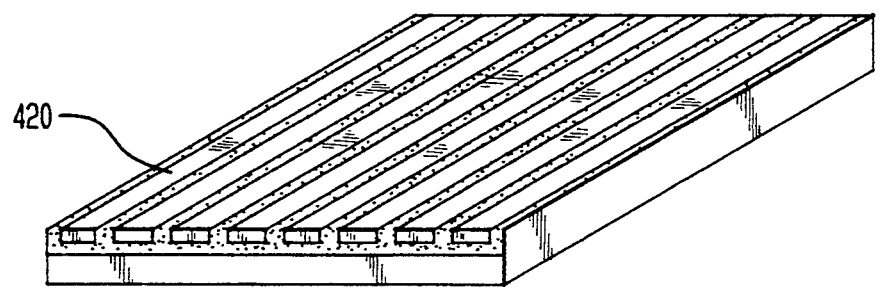

In a step 908, block 408 is ground and polished to expose glass 404 in the grooves of slotted magnetic material 402. The result is illustrated in FIG. 4C. Gap face 420 is now a contiguous planar surface comprising alternating rows of ferrite and glass. Each column of ferrite will ultimately become either read or write closure poles.

Figure 4D:
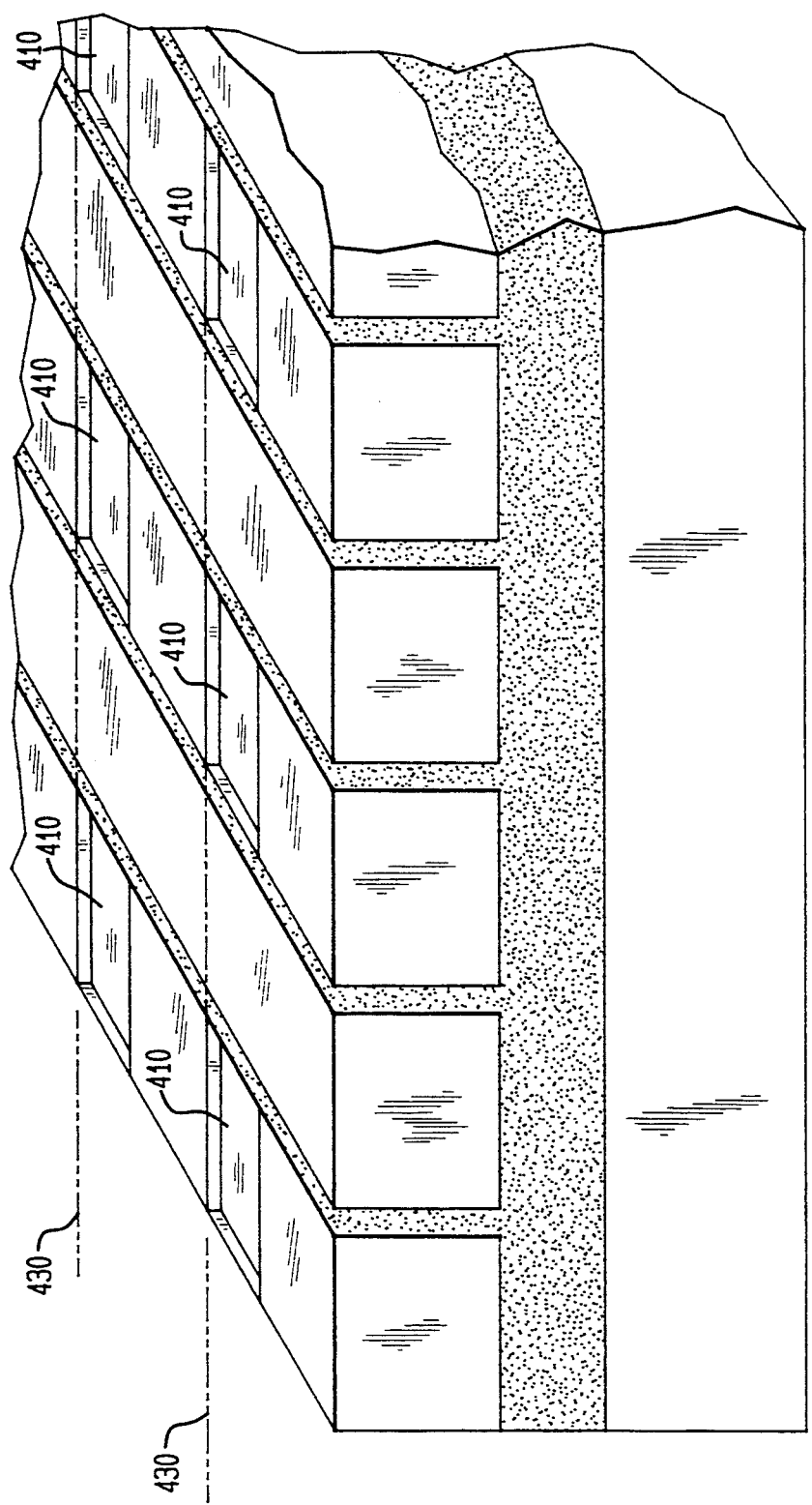

In a step 910, trenches 410 (FIG. 4D) are formed along each ferrite column that is to become write closure poles. These trenches are formed using the conventional processing techniques that include the steps of photoresist application, masking, photoprocessing, and ion milling. FIG. 4D illustrates a process where the completed closure portion module 300 will have an alternating pattern of read and write poles.

In a step 912, high $B_s$ composition 312 is deposited on the entire surface 420 using, for example, sputtering techniques. The area over the trenches 410 is masked using photoresist techniques. Surface 420 is ion milled to remove the high $B_s$ composition from the unmasked areas.

In a step 914, the wafer is flat-lapped to provide a contiguous planar surface of ferrite, high $B_s$ composition and glass. This surface will form gap face 802.

In a step 916, after the wafer is flat-lapped a thin layer of insulating material is deposited thereon to cover the entire closure module.

In a step 918, the wafer is sliced at the high $B_s$ composition junction (illustrated by dashed lines 430) to create a closure module comprising an alternating pattern of read and write closure poles with high $B_s$ composition on the write closure poles. Step 918 can be performed before step 914 in an alternative embodiment.

In a step 920 the closure module is bonded to a substrate (with read and write coils thereon) then ground and lapped to provide a substantially convex top surface. The module is positioned such that gap 304 is formed between the gap faces of both halves, thus forming the configuration illustrated in FIG. 3. In a preferred embodiment, gap 304 is 1.2 microns wide ±100 nanometers. Other widths and tolerances may be chosen. The width of gap 304 is controlled by controlling the thickness of the read/write coils affixed to substrate 308, the thickness of insulating layers on top of the read and write coils and also by controlling the thickness of the insulation layer deposited in step 916.

The closure module is positioned such that read closure poles are adjacent to the magneto-resistive sensors on the substrate, and write closure poles are adjacent to the write coils on the substrate.

Figure 10:
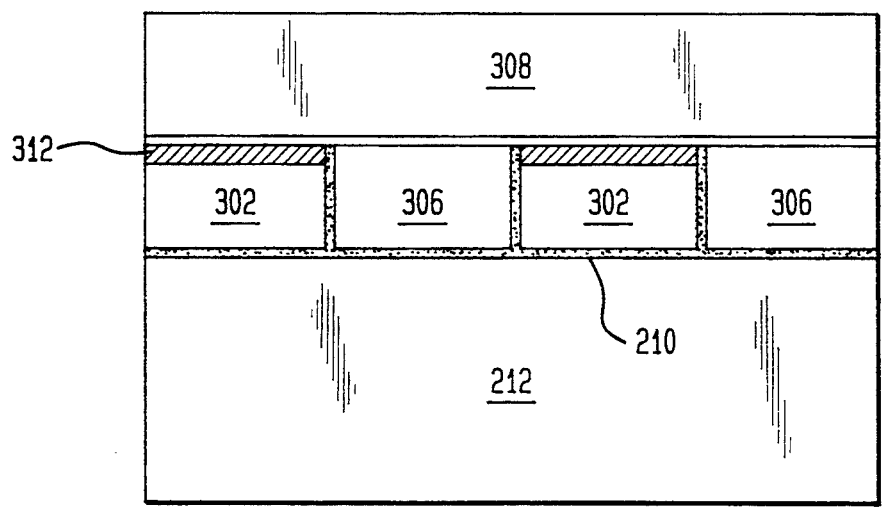
FIG. 10 is a diagram illustrating a situation where the closure gap face is not a single contiguous planar surface.

Processing the closure as described above with reference to FIG. 9 allows gap face 802 to have a planar surface. Having a single contiguous planar surface provides a distinct advantage over a non-planar surface. FIG. 10 illustrates a multi-track tape head module wherein the gap face of the alternate pattern of poles is not a single contiguous planar surface. This is because, in this case, the poles were not etched before high $B_s$ composition 312 was deposited. Referring to FIG. 10, in this non-planar configuration, the edges of the high $B_s$ composition 312 are likely to crumble and lose their structural integrity when the tape head module is taken through the mechanical processes of grinding and lapping after the closure and substrate bonding takes place. This has the result of changing the width of the write track written onto the magnetic tape. Providing a single contiguous planar surface eliminates this problem.

Figure 6:
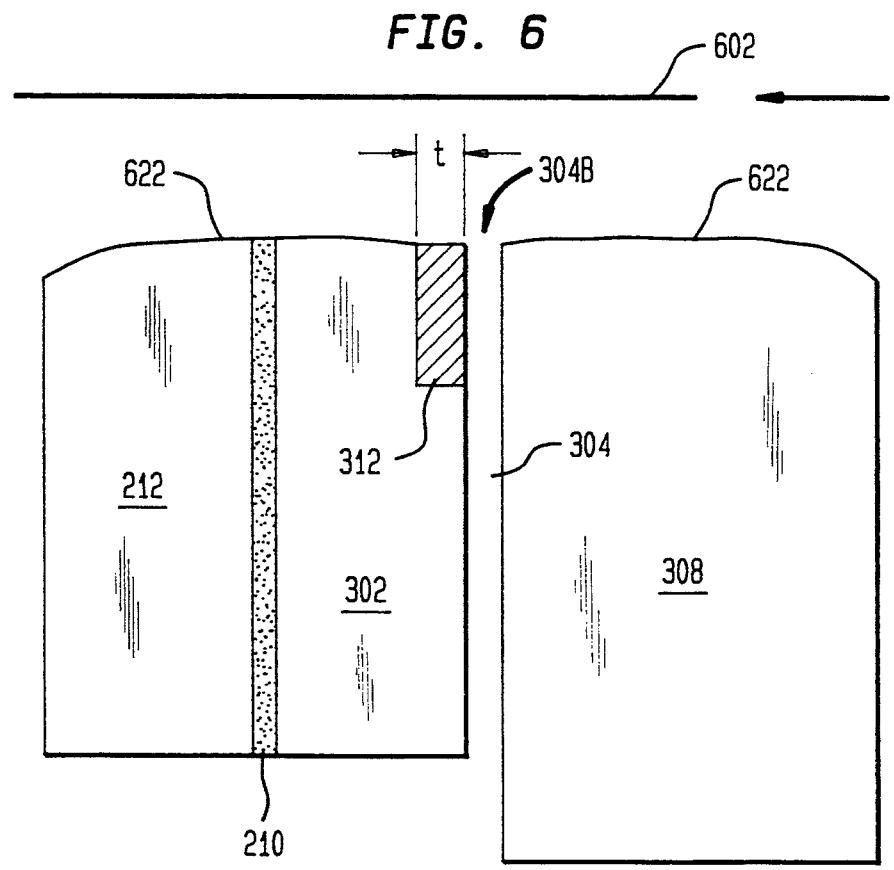
FIG. 6 is a cross-sectional end view of a write track of a multi-track longitudinal magnetic tape head module having a high $B_s$ composition at the write gap.

A cross-sectional end view of one write track is illustrated in FIG. 6. As can be seen in FIG. 6, write pole 302 is positioned such that gap 304 separates it from substrate 308. Write gap 304B is at the top surface 622 (which is a convex surface) of the write track. Write gap 304B provides a magnetic field to magnetic tape 602 passing over write gap 304B at top surface 622. In this manner, data is written to magnetic tape 602.

Figure 7:
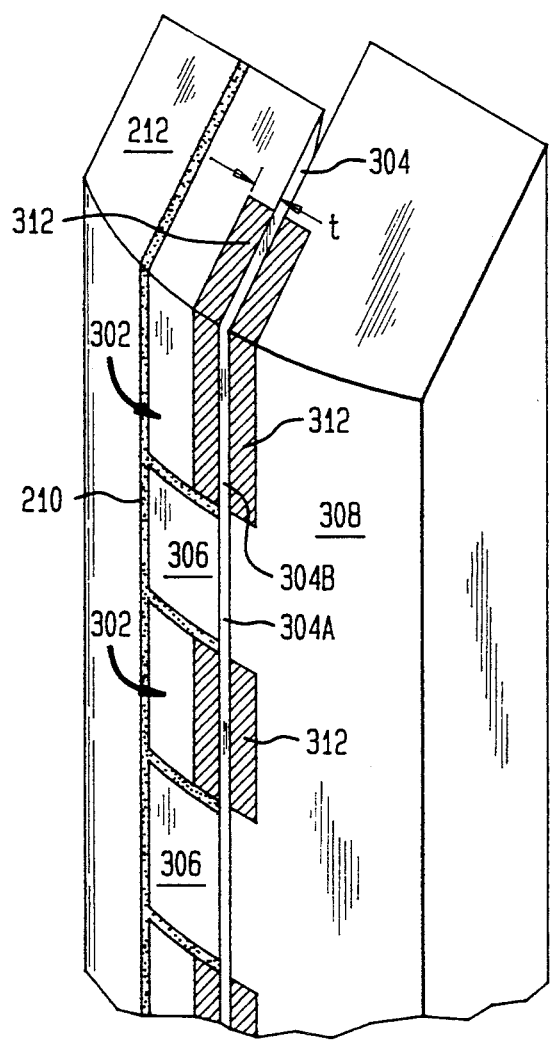
FIG. 7 illustrates a multi-track longitudinal magnetic tape head module having a high $B_s$ composition on both sides of the write gap.

According to one embodiment, high $B_s$ composition 312 is provided on only the write pole 302 half of each write track. This embodiment is illustrated in FIGS. 3 and 6. A second embodiment has high $B_s$ composition 312 on both write pole 302 and substrate 308 for each write track. Although more costly to manufacture, this alternative embodiment offers potentially more uniform gapfield for write operations. An example of this alternative embodiment is illustrated in FIG. 7.

Figure 5:
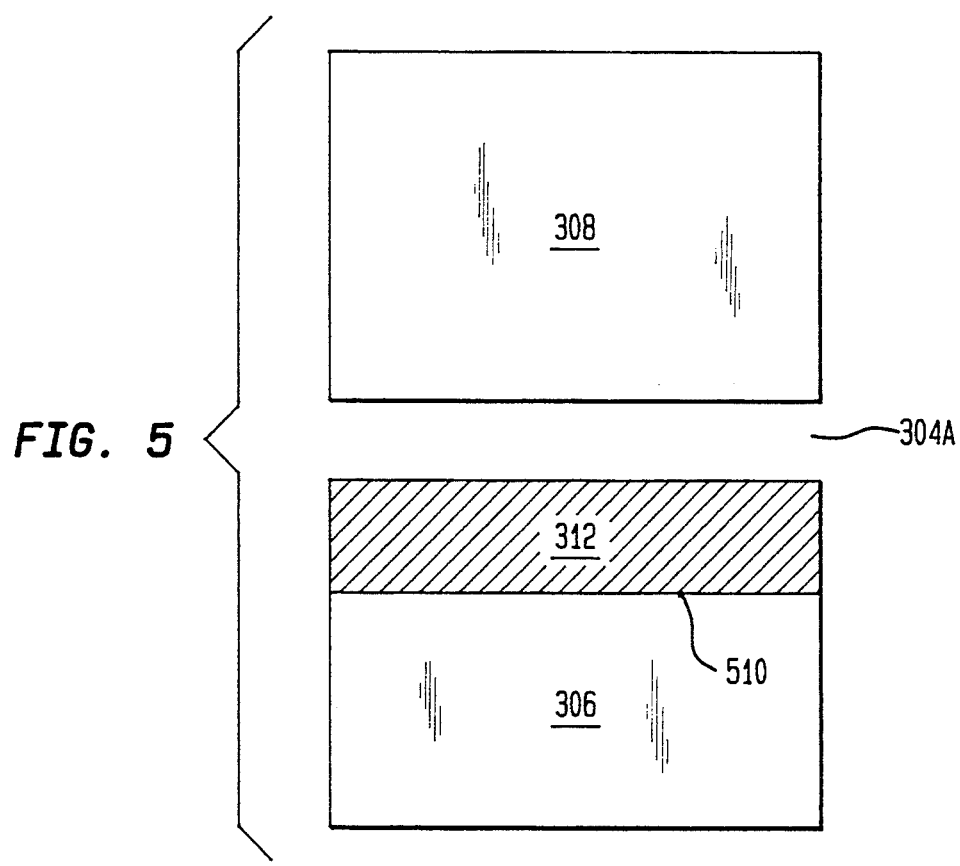
FIG. 5 is a diagram illustrating a second read gap formed when a high $B_s$ composition is included in a read pole.

According to the present invention, high $B_s$ composition 312 is not provided on read pole 306 or on substrate 308 opposite thereto. FIG. 5 illustrates a case where high $B_s$ composition 312 is deposited on read pole 306. Referring now to FIG. 5, the standard read gap 304A is formed between high $B_s$ composition 312 and substrate 308. Also, a second read gap 510 is created if the junction between high $B_s$ composition 312 and read pole 306 is "magnetically dead." The flux in read gap 304A changes continually as a magnetic tape passes over the read element. These changes are monitored by the magneto-resistive sensor present in read gap 304A. However, if an inductive coil is used as the read sensor, the second gap 510 will introduce unwanted noise into the signal.

Figure 11:
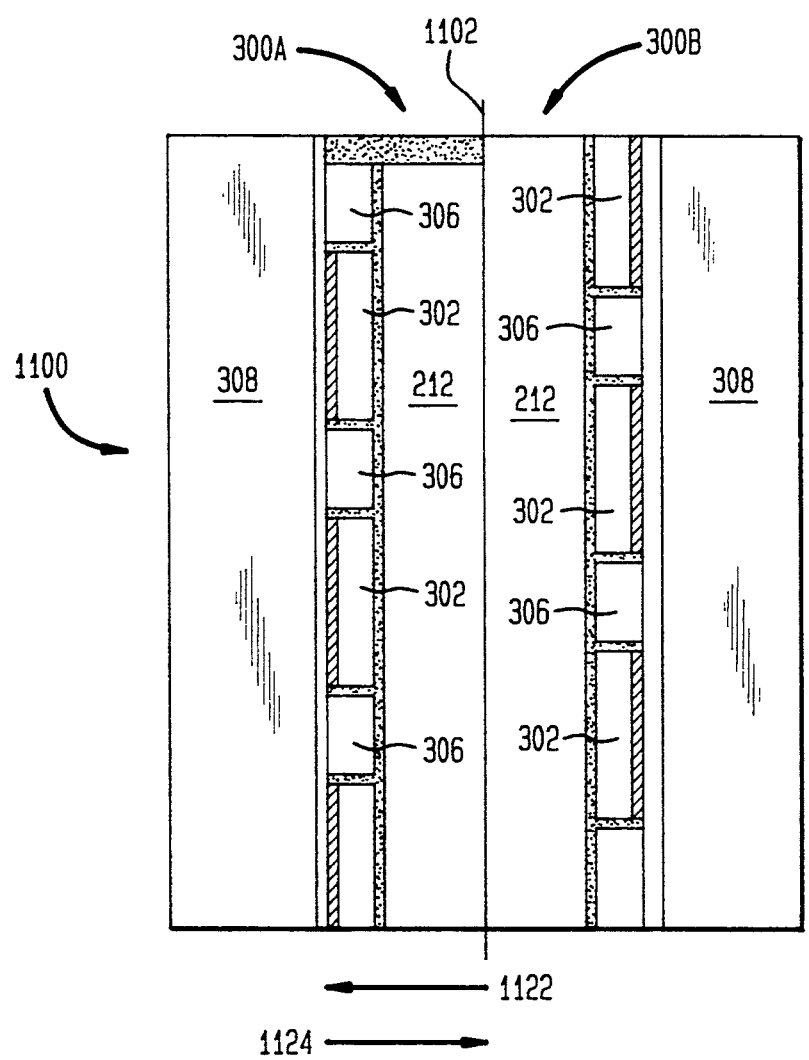
FIG. 11 is a diagram illustrating a bi-directional read/write multi-track, longitudinal magnetic tape head according to an implementation of the present invention.

The magnetic tape head module according to the present invention can be implemented to provide a bi-directional read/write capability. FIG. 11 illustrates a bi-directional read/write multi-track, longitudinal magnetic tape head 1100. Referring to FIG. 11, two magnetic tape head read/write modules 300 are positioned adjacent to one another and are separated by a shield 1102. Shield 1102 is used to magnetically isolate the two tape head modules 300 and is typically made of copper or a similar material.

Write poles 302 and read poles 306 are positioned on tape head module 300A, 300B such that a read pole 306 on tape head module 300A is adjacent to a write pole 302 on tape head module 300B. Similarly, write pole 302 on tape head module 300A is adjacent to a read pole 306 on tape head module 300B. In this configuration, data can be written to a magnetic tape traveling in a direction indicated by arrow 1122 by write elements on tape head module 300B. This same data can be immediately read from the magnetic tape using the adjacent read element on tape head module 300A. Likewise, for a magnetic tape moving in the direction indicated by arrow 1124, data is written by a write element of tape head module 300A and immediately read by a read element of tape head module 300B. By immediately reading the data that has been written in this manner, it can be immediately determined whether a write error has occurred.

In an alternative embodiment, a magnetic tape head could be implemented with a single read/write module 300.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A multi-track, longitudinal magnetic tape head for writing information to high-coercivity magnetic tapes, comprising:
    a plurality of write poles, each having a first gap surface and a top surface, wherein said top surface is adjacent to said first gap surface and at an angle to said first gap surface;
    a substrate comprising a block of magnetic material having a second gap surface;
    wherein said write poles are positioned such that said first gap surface of each said write pole is substantially parallel to said second gap surface of said substrate, and said first and second gap surfaces are separated so as to form a write gap therebetween;
    a plurality of coils, wherein each coil is positioned in proximity to a corresponding one of said write poles and said substrate such that each coil produces a gap field across each said write gap in response to a write current provided to said coil;
    insulating material interposed between said write poles; and
    a thin layer of high $B_s$ provided on each said write pole at said first gap surface such that said gap surfaces of said plurality of write poles form a single contiguous planar surface.

2. The tape head of claim 1, wherein said thin layer of high $B_s$ material is 1 to 6 microns thick.

3. The tape head of claim 1, wherein said thin layer of high $B_s$ material is 2 microns thick.

4. The tape head of claim 1, further comprising:
    a plurality of read poles adjacent to said write poles, each read pole having a third gap surface and a top surface, wherein said top surface is adjacent to said third gap surface and at an angle to said third gap surface and wherein said third gap surface is separated from said substrate by a narrow read gap; and an insulating material interposed between said read poles and said write poles.

5. The tape head of claim 4, wherein said plurality of read and write poles form a contiguous pattern of read and write poles, said read and write poles are separated from each other by said insulating material, and said contiguous pattern is positioned parallel to said substrate and separated from said substrate by said read and write gaps.

6. The tape head of claim 5, wherein said contiguous pattern of read and write poles and said substrate are partially embedded in an insulating material.

7. The tape head of claim 5, wherein said contiguous pattern of read and write poles is an alternating pattern of read and write poles.

8. The tape head of claim 1, further comprising a thin layer of high $B_s$ material provided on said substrate, adjacent to each said write gap.

9. The tape head of claim 1, wherein said high $B_s$ composition is a multilayered laminate comprising alternating layers of a high $B_s$ alloy and insulating material.

10. The tape head of claim 1, wherein said high $B_s$ composition is a high $B_s$ alloy.

11. A magnetic tape drive capable of writing to high-coercivity magnetic tapes, comprising a multi-track longitudinal magnetic tape head capable of writing information to high-coercivity magnetic tapes, the multi-track longitudinal magnetic tape head comprising:

a plurality of write poles, each having a first gap surface and a top surface, wherein said top surface is adjacent to said first gap surface and at an angle to said first gap surface;

a substrate comprising a block of magnetic material having a second gap surface;

wherein said write poles are positioned such that said first gap surface of each said write pole is substantially parallel to said second gap surface of said substrate, and said first and second gap surfaces are separated so as to form a write gap therebetween;

a plurality of coils, wherein each coil is positioned in proximity to a corresponding one of said write poles and said substrate such that each coil produces a gap field across each said write gap in response to a write current provided to said coil;

insulating material interposed between said write poles; and a thin layer of high $B_s$ material provided on each said write pole at said first gap surface such that said gap surfaces of said plurality of write poles form a single contiguous planar surface.

12. The magnetic tape drive of claim 11, wherein said magnetic tape head further comprises:

a plurality of read poles adjacent to said write poles, each read pole having a third gap surface and a top surface, wherein said top surface is adjacent to said third gap surface and at an angle to said third gap surface and wherein said third gap surface is separated from said substrate by a narrow read gap; and an insulating material interposed between said read poles and said write poles.

13. The magnetic tape drive of claim 12, wherein said plurality of read and write poles form a contiguous pattern of read and write poles, said read and write poles are separated from each other by said insulating material, and said contiguous pattern is positioned parallel to said substrate and separated from said substrate by said read and write gaps.

14. The magnetic tape drive of claim 13, wherein said contiguous pattern of read and write poles and said substrate are partially embedded in an insulating material.

15. The magnetic tape drive of claim 13, wherein said contiguous pattern of read and write poles is an alternating pattern of read and write poles.

16. The magnetic tape drive of claim 11, wherein said high $B_s$ composition is a multi-layered laminate comprising alternating layers of a high $B_s$ alloy and insulating materials.

17. The magnetic tape drive of claim 11, wherein said high $B_s$ composition is a high $B_s$ alloy.

18. The magnetic tape drive of claim 11, wherein said magnetic tape head further comprises high $B_s$ composition deposited on said substrate, adjacent to said write gap.

19. The magnetic tape drive of claim 11, wherein said thin layer of high $B_s$ material is 1 to 6 microns thick.

20. The magnetic tape drive of claim 11, wherein said thin layer of high $B_s$ material is 2 microns thick.

* * * * *

UNITED STATES PATENT AND TRADEMARK OFFICE
CERTIFICATE OF CORRECTION

PATENT NO  : 5,394,285

DATED      : February 28, 1995

INVENTOR(S) : Richard H. Dee, et. al.

It is certified that error appears in the above-identified patent and that said Letters Patent is hereby corrected as shown below:

Title page, item [75], inventors: should read as follows: Richard H. Dee, Ramesh Sundaram and Mahedavan Ramesh.

Signed and Sealed this

Twenty-third Day of May, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,394,285
DATED      : February 28, 1995
INVENTOR(S): Richard H. Dee, Ramesh Sundraram, Mahadevan Ramesh It is certified that error appears in the above-indentified patent and that said Letters Patent is hereby corrected as shown below:

On the title page item [75], "Inventor: Richard H. Dee, Mahedavan Ramesh, Ramesh Sundaram," with:

--Inventor: Richard H. Dee, Ramesh Sundaram, Mahadevan Ramesh--

This certificate supersedes Certificate of Correction filed May 23, 1995.

Signed and Sealed this

Ninth Day of January, 1996

Attest:

BRUCE LEHMAN

*Attesting Officer*  *Commissioner of Patents and Trademarks*